(12) United States Patent
Agrahara

(10) Patent No.: US 7,974,523 B2
(45) Date of Patent: Jul. 5, 2011

(54) OPTIMAL BUFFERING AND SCHEDULING STRATEGY FOR SMOOTH REVERSE IN A DVD PLAYER OR THE LIKE

(75) Inventor: Aravind C. Agrahara, Fremont, CA (US)

(73) Assignee: Magnum Semiconductor, Inc., Milpitas, CA (US)

( * ) Notice: Subject to any disclaimer, the term of this patent is extended or adjusted under 35 U.S.C. 154(b) by 1714 days.

(21) Appl. No.: 10/948,745

(22) Filed: Sep. 24, 2004

(65) Prior Publication Data

US 2006/0008248 A1     Jan. 12, 2006

Related U.S. Application Data

(60) Provisional application No. 60/585,072, filed on Jul. 6, 2004.

(51) Int. Cl.
*H04N 5/783* (2006.01)
(52) U.S. Cl. .......................................... 386/343
(58) Field of Classification Search ............... 386/68
See application file for complete search history.

(56) References Cited

U.S. PATENT DOCUMENTS

| | | | | |
|---|---|---|---|---|
| 5,812,772 A | * | 9/1998 | Hasegawa | 709/202 |
| 6,009,229 A | * | 12/1999 | Kawamura | 386/68 |
| 7,194,189 B2 | * | 3/2007 | Halfant | 386/68 |

* cited by examiner

*Primary Examiner* — Peter-Anthony Pappas
*Assistant Examiner* — Daniel Tekle
(74) *Attorney, Agent, or Firm* — Robert Platt Bell

(57) ABSTRACT

The optimal buffering strategy of the present invention allows for full smooth reverse functionality in an MPEG-type stream player, while reducing the buffering requirements. Furthermore, the buffering strategy drastically reduces the required number of passes through the video data unit by optimal scheduling of picture decodes. A video data unit buffering strategy for smooth reverse includes the following operations. First, a video data unit is scanned before decoding any pictures within the video data unit. Positions of each picture are then marked out in the video data unit. Next, the entire video data unit is decoded, except the open GOP pictures which need a reference picture from an adjacent video data unit. The open GOP pictures are then copied to the end of the current video data unit in the buffer, and the new video data unit continues to be fetched.

17 Claims, 9 Drawing Sheets

| Picture No | Picture Type | Offset within VOBU buffer | Picture Structure |
|---|---|---|---|
| 0 | I | 0x80000 | frame |
| 1 | B | 0x90000 | frame |
| 2 | P | 0xa0000 | frame |
| 3 | P | 0xb0000 | frame |
| 4 | P | 0xc0000 | frame |
| 5 | B | 0xca000 | frame |
| 6 | P | 0xf0000 | frame |
| 7 | B | 0x100000 | frame |
| 8 | P | 0x110000 | frame |
| 9 | B | 0x120000 | frame |
| 10 | P | 0x140000 | frame |
| 11 | B | 0x14a000 | frame |
| 12 | I | 0x02000 | frame |
| 13 | B | 0x24000 | frame |
| 14 | P | 0x30000 | frame |
| 15 | B | 0x35000 | frame |
| 16 | P | 0x38000 | frame |
| 17 | B | 0x40000 | frame |

| I | B | B | P | B | P | B | P | B | P | B | P | B | P | B | P | B |
|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 |

Figure 7

| Time | Frame Buffers | Comments |
|---|---|---|
| 0 | P1, P4, P5, P6, P7 | P2, P3 are Open GOP pictures. |
| 3 | P1, P4, P5, P7, C1 | Though we can have 3 decodes, only one can be done since frame buffers are not free |
| 6 | P1, P4, P5, C4, C1 | We can perform three decodes before next display, which takes us from C4 to C10 |
| 9 | P1, P5, C6, C8, C10 | We can perform three decodes before next display, which takes us from C10 to C16 |
| 12 | P1, C10, C12, C14, C16 | We need to decode the Open GOP Bs. C10 is re-used. |
| 15 | P1, C12, C14, C16, P2 | P3 is decoded into the same buffer as P2. |
| 18 | C1, C12, C14, C16, P3 | |

OPTIMAL BUFFERING AND SCHEDULING STRATEGY FOR SMOOTH REVERSE IN A DVD PLAYER OR THE LIKE

CROSS-REFERENCE TO RELATED APPLICATIONS

The present application claims priority from Provisional U.S. Patent Application No. 60/585,072 filed on Jul. 6, 2004, and incorporated herein by reference.

FIELD OF THE INVENTION

The present invention relates to DVD and other types of video playback equipment. In particular, the present invention is directed toward a buffering strategy for providing smooth reverse playback of MPEG-2 encoded and other types of data streams.

BACKGROUND OF THE INVENTION

Due to the nature of video encoding on DVD discs and other MPEG-2 and similar data streams, providing smooth reverse action in order to play a video stream backwards in real time (or at high speed, slow motion, or the like) is often difficult.

Three types of pictures (sometimes referred to as "frames") are defined in the MPEG (Moving Pictures Experts Group) standards: intra (I) pictures, predicted (P) pictures, and bi-directionally interpolated (B) pictures. I pictures provide access points for random access, but only with a moderate compression. P pictures are coded with reference to a previous picture, in which the previous picture can be either I picture or P picture. B pictures may be compressed with a low bit rate, using both previous and future references. The B pictures are never used as the references. The relationship between the three picture types is illustrated in FIG. 9. The MPEG standard does not impose any limit to the number of B pictures between the two references, or the number of pictures between two I pictures.

FIG. 11 is a diagram illustrating the relationship between Video Object Units (VOBUs) 710, Groups of Pictures (GOPs) 720, and individual frames or pictures of video data 730. As illustrated in FIG. 11, the sequence of pictures starting with an I picture up to the last picture before the next I picture is referred to a Group of Pictures (GOP). A GOP is the smallest unit of data that can be independently accessed. The sequence of pictures in the coded stream is such that the coded reference pictures are always placed ahead of the coded pictures that use the reference pictures. For example, if the sequence of pictures in the coded stream is IPBB, the display sequence will be IBBP. This type of data compression may generally be referred to as temporal compression since this compression exploits the temporal redundancies in addition to spatial redundancies in the data. However, such a compression scheme requires that the data be decoded in the same order it is encoded.

Thus, if a user wishes to see the pictures displayed in reverse order, so as to back up to a particular section, the process becomes much more difficult. A brute force approach for rendering video frames of data in reverse order requires that the frames first be constructed by decoding a GOP in a forward order, and then be displayed in reverse order (since the data has to be decoded in the same order that it was stored). Buffering multiple video frames of data to accomplish this task requires an inordinate amount of buffer space and a significant amount of processor overhead.

As a result, most consumer DVD players provide only limited frame display in reverse order. Since an I picture is the only type that contains all data for a complete image, without reference to data from other pictures, most consumer DVD players, when set to reverse mode, will play only successive I pictures in reverse order. As a result, the consumer sees a stilted "stop action" type of image, rather than a smooth reverse image. Since the number of I pictures is only a fraction of the overall number of pictures, reverse playback on most machines is usually at a rate of, for example, 4×, 8×, 16×, or 32× of normal speed, making it difficult for a user to stop at a particular part of a video program.

A smooth playback of the video stream in reverse order is desirable for a number of reasons. Such a feature would allow the consumer to reverse play the DVD images to a particular frame or section and would also provide a better reverse display, which is less disorienting than the flashing "stop action" types of displays presently used. In addition, the ability to play video in a reverse and forward direction smoothly better emulates the actions of tape players and other video equipment, making the use of MPEG-2 encoded data more acceptable to professional video users as a data feed source as opposed to decoded data. The ability to smooth reverse images allows a user to better edit video on a frame-by-frame basis.

The term "smooth" and/or "slow" reverse refers to the ability to playback smoothly (i.e., decode and display all the pictures) of a DVD (or other) video stream in reverse. The MPEG encoded video used in DVD does not lend itself naturally to this feature since MPEG video encoding exploits temporal redundancies in the forward direction, thereby constraining the order in which pictures can be decoded.

Referring back to FIG. 11, MPEG video data is carried in a DVD video stream in the form of Video Object Units (VOBUs) 710. A VOBU 710 is the minimal unit of data that can be accessed via navigation data in a DVD system. Streams compliant to the DVD and DVD-like recording standards store video information in VOBUs 710. Each VOBU 710 typically encodes a small fixed duration of video between 0.4 to 1.0 seconds and comprises a number of MPEG-2 frames. The VOBUs are arranged linearly on a DVD or other media.

Each VOBU 710 is guaranteed to contain one or two Group Of Pictures (GOPs) 720. Each GOP 720 can contain, at most, 18 pictures in a DVD-Video stream. Pictures 730 could be either I, B, or P types. Pictures 730 within a GOP 720 have to be decoded in the order in which the data is encoded in order to produce a stream of video data.

Consider an example of two VOBUs, VOBU#N and VOBU#N+1 from a DVD video stream as illustrated in FIG. 1. The two VOBUs may contain one GOP each, and the GOP in this case may contain fourteen pictures, illustrated as I, B, and P pictures and numbered 1 through 14. FIG. 1 illustrates the situation in normal forward direction playback. FIG. 2 illustrates the situation in a smooth reverse playback system.

Referring to FIG. 2, in order to display the frames in the order shown, it may be required to decode the VOBUs more than once. The actual number of passes that might be required will depend on the number of frame buffers and the desired smooth reverse speed. For example, consider the VOBU illustrated in FIG. 2. For the sake of simplicity, the open GOP pictures (2 and 3) are ignored. With four frame buffers, a prior art system will first decode the entire VOBU and retrieve Group of Pictures 11, 12, 13 and 14. Pictures 13 and 14 can only be displayed out of these pictures since picture 10 has to be presented before picture 11 and 12. Therefore, the prior art system will make a second pass through the VOBU and obtain pictures 9, 10, 11 and 12. Again, the prior art system can only present pictures 10, 11 and 12 out of these pictures since picture 7 has to be presented before picture 9. The prior art system makes a third pass through the VOBU to obtain pictures 6, 7, 8 and 9. The prior art system can only present pictures 7, 8 and 9 out of these pictures since picture 4 has to be presented before picture 6. The prior art system processes a fourth pass, yielding pictures 1, 4, 5 and 6.

As can be seen, a prior art smooth reverse playback engine will require a great amount of processing power. Furthermore, since the number of passes required can only be reduced by increasing the number of frame buffers, a prior art system may also require a significant amount of frame buffer memory, which is an expensive resource in an embedded system. Thus, reducing the number of passes through the VOBU that the decoder will have to make is extremely desired.

Referring again to FIG. 2, pictures 2 and 3 of either VOBU need picture 1 of the current VOBU and picture 13 of the previous VOBU in order to be decoded. Thus, pictures 2 and 3 of VOBU#N+1 need picture 1 of VOBU#N+1 and picture 13 of VOBU#N. Such GOPs may be referred to as "Open GOPs", as they are not self-contained for decoding purposes, but rather require data from an adjacent GOP.

As illustrated in these examples, open GOPs do not require any additional buffering of the stream data when doing normal forward-direction play, since the last reference picture of a GOP would have been displayed just before starting to decode the first picture of the next GOP, thereby making the reference picture readily available to decode the open GOP pictures. However, when executing a reverse smooth play operation, the open GOP pictures 2 and 3 of VOBU#N+1 cannot be decoded until the decoder has been through VOBU#N and decoded picture 13 of VOBU#N, thereby implying that the stream buffer used by VOBU#N+1 cannot be freed even while the decoder has started to work on VOBU#N. In other words, a Prior Art system needs to buffer the stream data for two entire VOBUs in order to guarantee smooth playback in reverse order.

The maximum bit-rate for DVD-Video is 9.8 Mbps. The VOBU duration is constrained to be less than or equal to one second. Therefore, the maximum size of a VOBU will be 9.8 Megabits or 1.225 Mbytes. Thus, two VOBUs of buffering are required to provide smooth reverse play in a Prior Art DVD player or other MPEG or MPEG-like data stream. Two VOBUs of buffering implies a requirement of 2.45 Mbytes of buffering space, a considerable amount on a single chip and/or in a consumer product. Thus, it would be desirable to provide smooth reverse capability with minimal buffering space.

SUMMARY OF THE INVENTION

The optimal scheduling strategy for the decoder allows for smooth reverse playback at speeds faster than or equal to 0.5×. The optimal buffering strategy of the present invention allows for full smooth reverse operation in an MPEG-type stream player, while reducing the buffering requirements from the above-derived 2.45 Mbytes to as little as 1.225 Mbytes, offering a savings of 1.15 Mbytes.

VOBU buffering and scheduling strategy for smooth reverse includes the following operations. First, a video data unit (e.g., VOBU, GOP or the like) is scanned before decoding any pictures within the video data unit. Positions of each picture are then marked out in the video data unit, and the display order is set as per the video data unit structure. Next, all the reference pictures of the video data unit are scheduled for decoding, taking into account the number of frame buffers available.

Then, the system proceeds to decode the references in the scheduled order. The B pictures are scheduled for decode independently and are decoded on demand. The decoded pictures are displayed as set out in the display order. Once the entire video data unit (except for pictures which need a reference picture from an adjacent video data unit) is decoded and displayed, the system proceeds to the next video data unit. If required, the pictures requiring reference from an adjacent video data unit are copied to the end of the current video data unit in the buffer before the next video data unit processing begins.

The data is copied such that the end of the video data unit coincides with the end of the pictures requiring reference from an adjacent video data unit, and the remaining space (current video data unit size minus the size of pictures requiring reference from an adjacent video data unit) is released for streaming in data for the new video data unit.

The design allows for smooth reverse playback without the need for a large buffer and with minimal shifting of data within the buffer. Furthermore, since data from an adjacent GOP is copied to the end of the buffer as described above, the generality and extensibility of the circular buffer for stream data is not lost.

BRIEF DESCRIPTION OF THE DRAWINGS

FIG. 7 is a diagram of a second scenario, in which pictures from a previous GOP are represented as P1, P2, . . . , P17.

FIG. 8 is a table depicting the state of frame buffers at each display time.

DETAILED DESCRIPTION OF THE INVENTION

Figure 1:
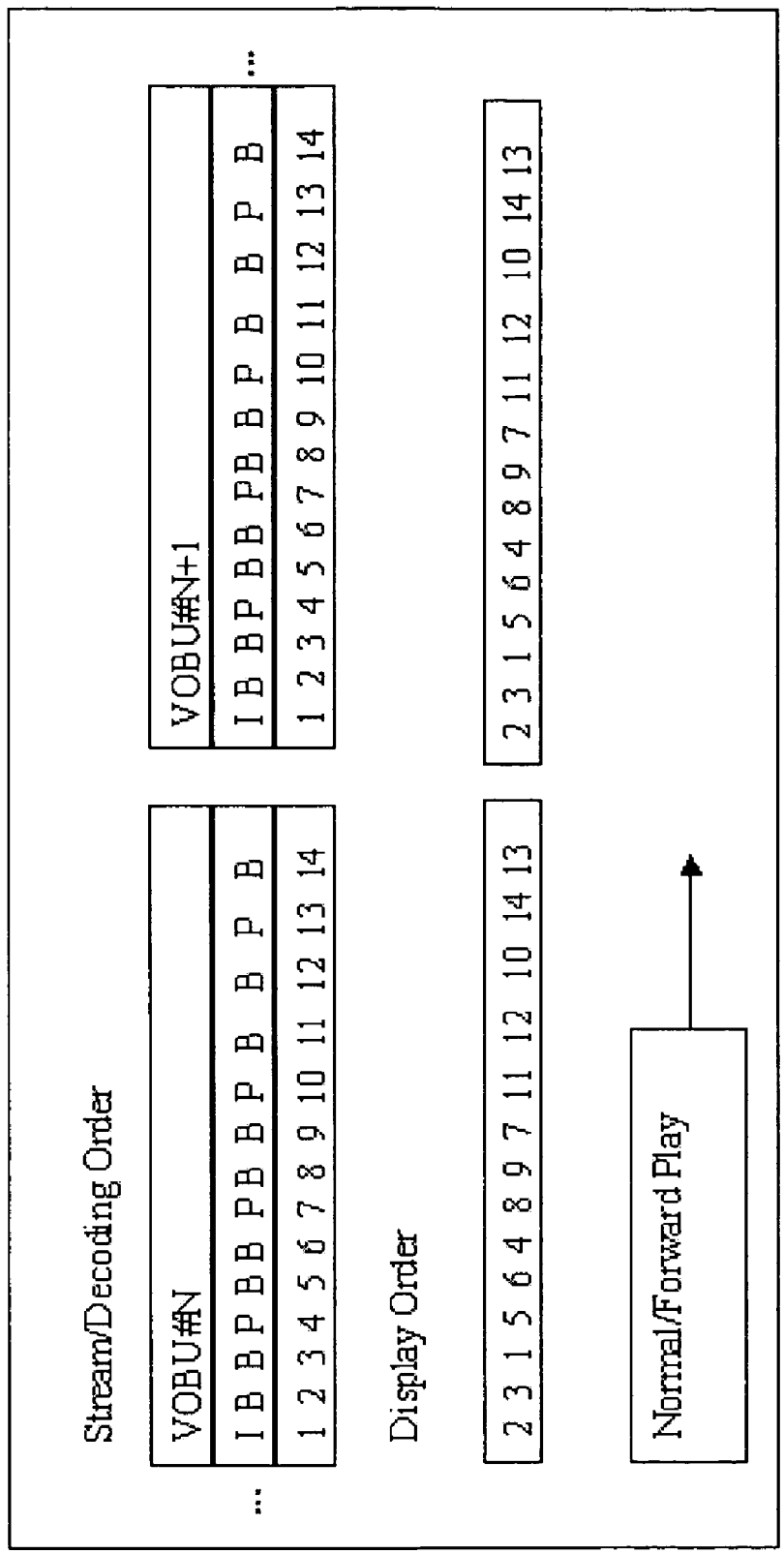
FIG. 1 is a diagram illustrating the arrangement of picture playback for two adjacent VOBUs during normal forward direction playback of an MPEG-type data stream.
Figure 2:
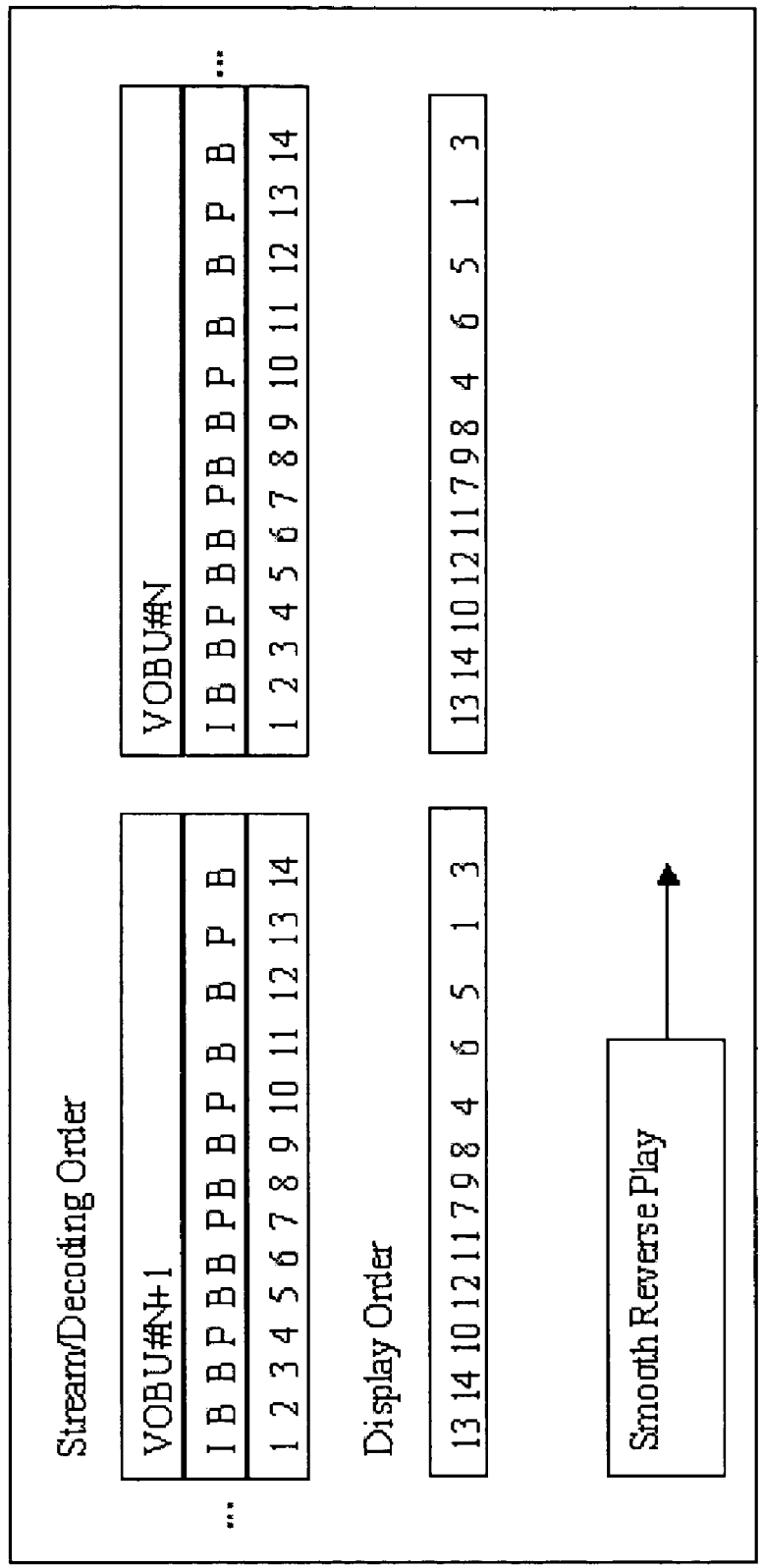
FIG. 2 is a diagram illustrating the arrangement of picture playback for two adjacent VOBUs during smooth reverse direction playback of an MPEG-type data stream.
Figure 3:
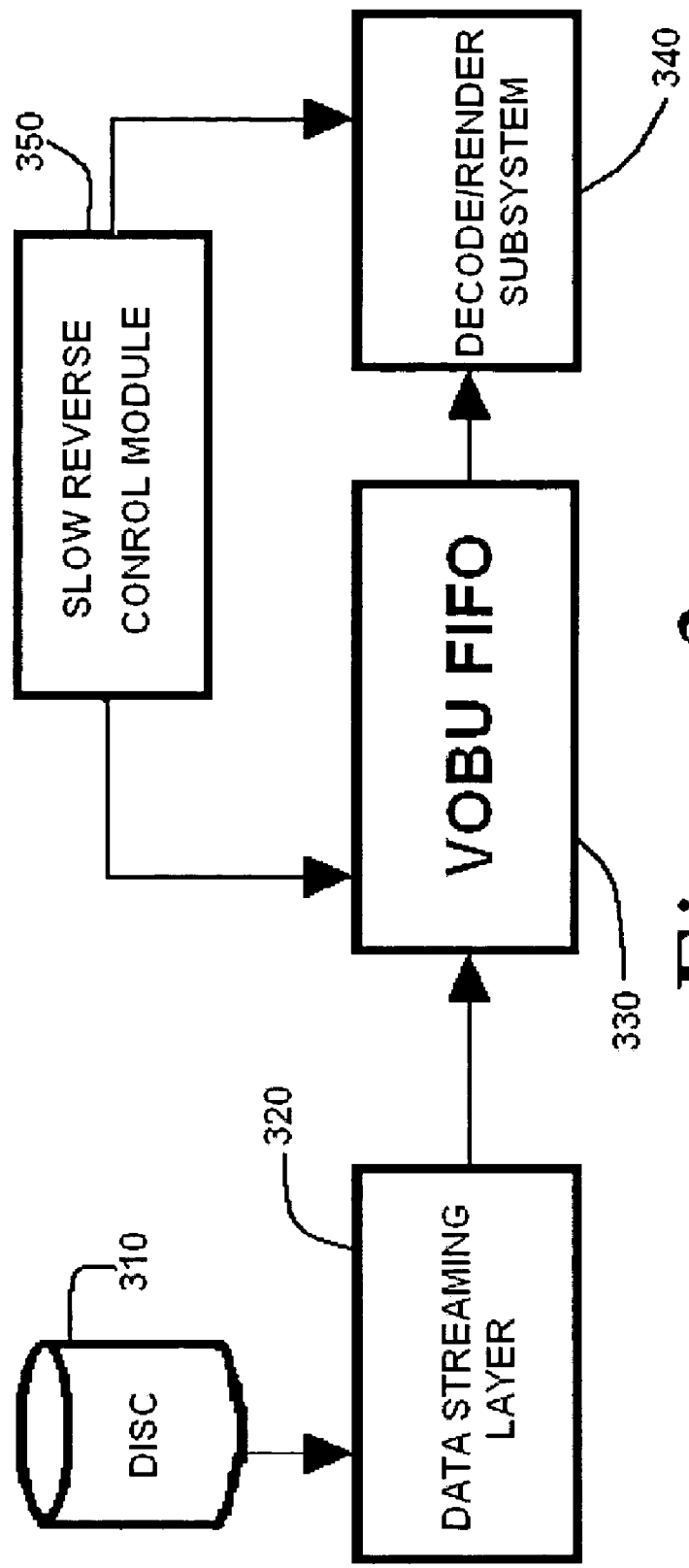
FIG. 3 is a simplified block diagram illustrating the implementation of the present invention.

The present invention provides a slow-reverse feature design within the framework of an existing system. FIG. 3 is a simplified block diagram illustrating the major components of the system. Video data, typically in MPEG-2 or similar format, is retrieved from disc 310, which may comprise a DVD disc, recordable DVD disc, rewritable DVD disc, or other data source (e.g., computer hard drive or the like).

Data streaming layer 320 may comprise a component, which retrieves the data from disc 310 and outputs a stream of VOBUs. Decoder and render subsystem 340 is designed to decode the MPEG or MPEG-type data and output a video data stream (e.g., in NTSC or other display format).

VOBU FIFO 330 is inserted between data streaming layer 320 and decode/render subsystem 340 to store encoded VOBUs from data streaming layer 320 for use by decode/render subsystem 340 in generating a video output image. VOBU FIFO 330 may comprise, for example, a circular buffer or the like. The optimal buffering strategy of the present invention allows for full smooth reverse operation in an MPEG-type stream player, while reducing the buffering requirements of VOBU FIFO 330.

Slow Reverse Control Module 350 comprises the logic that optimally controls the VOBU FIFO 330 and the Decoder and Render subsystem 340 to enable smooth reverse playback. Slow Reverse Control Module 350 controls and manages the initial VOBU scan, decode and display scheduling, and VOBU buffer control.

This design provides a number of performance features. For example, utilizing the slow reverse technique of the present invention enables smooth slow reverse playback at speeds slower than or equal to 0.5× for most practical GOP structures. The core ideas of the invention are applicable to any platform with a data streaming module and an MPEG decoder. The system provides scaleable performance in terms of number of frame buffers and/or memory availability. In addition, the invention is applicable to any MPEG-1 or MPEG-2 video application (e.g., DVD, VCD, SVCD, and the like).

The system is able to play a DVD-Video stream with a normal GOP structure in slow reverse order at true 0.5× without skip/repetition, given five frame buffers and 1.4 Mbytes of VOBU buffering. The term "normal GOP structure" implies GOPs with a length of 18 frames or fewer, of which at least half the number of frames are B-pictures.

Figure 4:
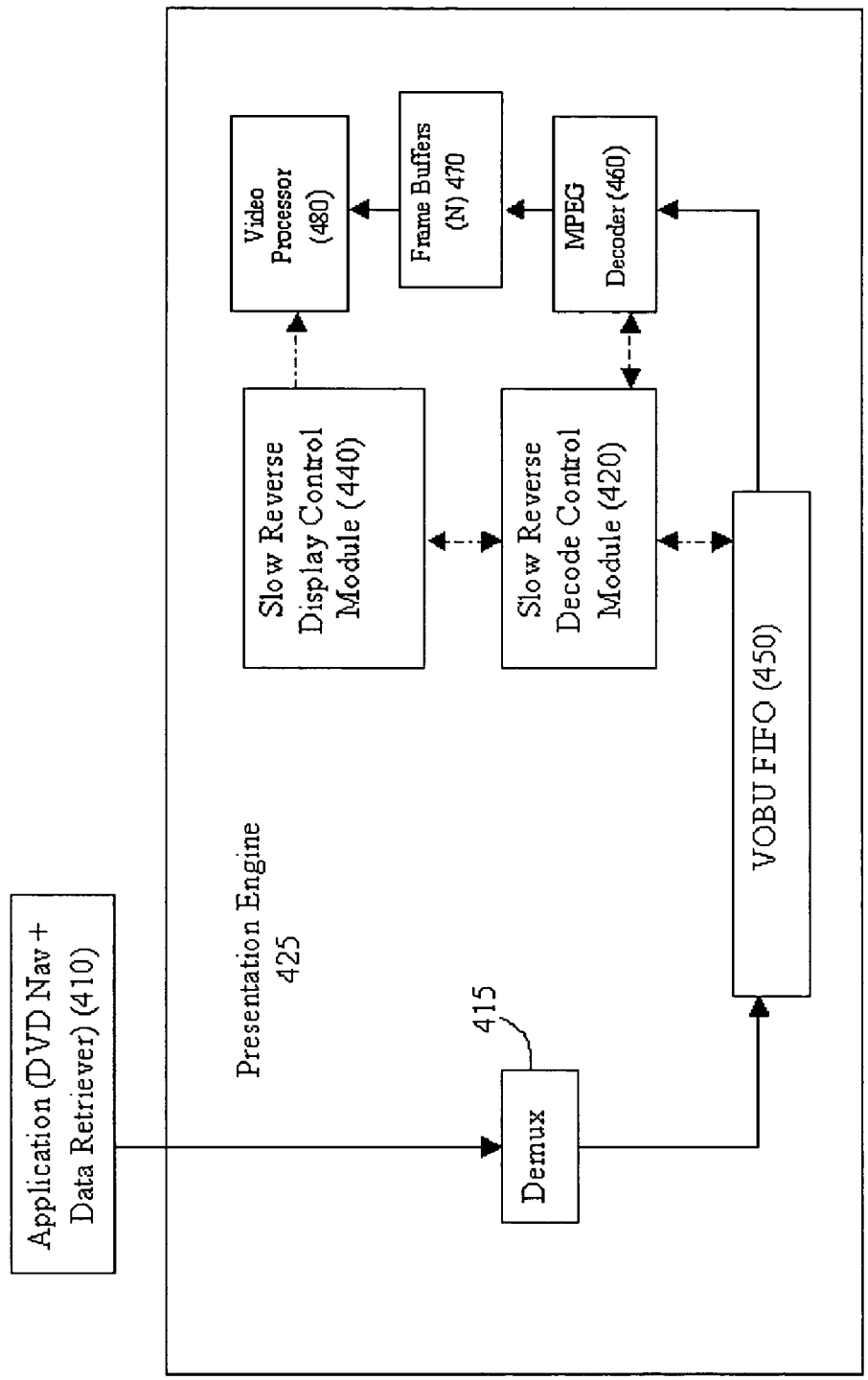
FIG. 4 is a block diagram illustrating the participating blocks in enabling the slow reverse feature.

FIG. 4 is a block diagram illustrating the operational blocks in enabling the slow reverse feature. Presentation engine 425 is the data consumption module, which aggregates the demux 415, MPEG decoder 460 and Slow Reverse Decode Control Module 420. The data/control flow is summarized in the following steps. The application (application here refers to DVD Nav 410) places the presentation engine 425 into slow reverse mode. At run-time, demux 415 directs the video data in the multiplexed stream to the VOBU buffer 450. VOBU buffer 450 is designed to hold video data from at-least one VOBU and at-most two VOBUs. The VOBUs are processed in the reverse order by the slow reverse motion control module 420; that is, VOBU #N of the title is processed before of VOBU #N−1, where {VOBU #N−1, VOBU #N} is the order in which the data is encoded and would be presented in the normal (forward) play.

As soon as a complete VOBU is available in VOBU buffer 450, the Slow Reverse Decode Control Module 420 scans the entire VOBU and extracts picture information for each picture in the VOBU. Slow Reverse Decode Control Module 420 uses the scan information and the available N number of frame buffers 470 to build the reference-frame (I and P) decoding sequence. The reference frame decoding sequence is specified as a sequence of commands. Each command will specify the references to be decoded as part of that command. The actual picture decoding is performed using the MPEG decoder 460. Decode Control Module 420 also derives the display order for the VOBU based on the scan information.

Decode Control Module 420 proceeds to execute the reference decode commands in order. Upon executing the first command, the remaining open GOP B-pictures from the previous VOBU (if any) are decoded (for an open GOP) using MPEG decoder 460. The B picture decodes are scheduled by Decode Control Module 420 "on-demand" from Slow Reverse Display Control Module 440. All reference decode commands are generated for the given VOBU, and B-picture decode requests generated by Display Control Module 440 are serviced in a timely fashion.

Once MPEG decoder 460 has decoded all the pictures of the VOBU, VOBU buffer 450 is freed up. Display Control Module 440 renders the ready pictures as per the identified order and periodicity and outputs the reverse rendered data stream to video processor 480 for display on a television or the like. Display Control Module 440 frees up frame buffers 470 wherever possible during the process, once the data in the frame buffer 470 has been displayed and is not required for subsequent decoding operations.

Figures 5, 6:
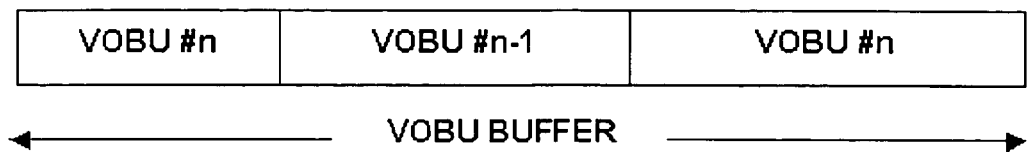
FIG. 5 is a diagram illustrating a first scenario where the VOBU buffer can hold two entire VOBUs.
FIG. 6 is a diagram illustrating an exemplary VOBU, in which the VOBU Buffer extends from 0 to 0x150000.
Figure 9:
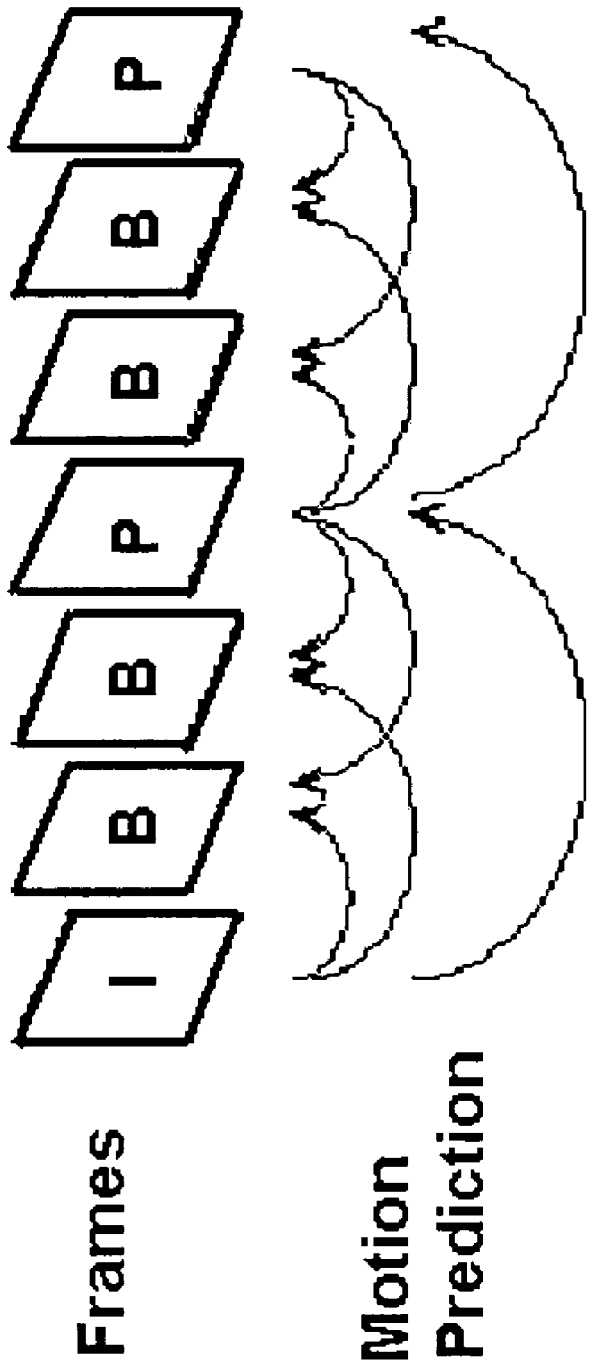
FIG. 9 is a diagram illustrating the arrangement of I, P, and B pictures in an MPEG encoded data stream in the Prior Art.

FIGS. 5-8 and 10 describe slow reverse playback design details in different scenarios in more detail in conjunction with FIG. 4. FIG. 5 is a diagram illustrating a first scenario in which the VOBU buffer can hold two entire VOBUs. Consider a typical run-time situation depicted in FIG. 5. As illustrated, VOBU#n is presently being processed in the buffer. After completely processing this VOBU, processing passes to VOBU #n−1.

Slow reverse decode control module 420 will start by parsing the entire VOBU. This pass involves just searching for all the picture start codes in the VOBU. No picture decode is performed. Therefore, this operation will be executed very quickly. Once the complete VOBU has been parsed, slow reverse decode control module 420 has a structure describing the offset of each picture within the VOBU and its type. FIG. 6 is a diagram illustrating the exemplary VOBU, in which the VOBU Buffer extends from 0 to 0x150000.

Slow reverse decode control module 420 then proceeds to decode the references as follows. For example, assume that in N frame buffers 470, five frame buffers (N=5) exist. In a steady state, one buffer would contain the I reference picture from the previous GOP, while one buffer would be used for B picture decode/display. Therefore, for the given example, the reference decodes will be done in the following order:

1st pass: Decode and set for display 12, 14, 16
    2nd pass: Decode and set for display 6, 8, 10
    3rd pass: Decode and set for display 2, 3, 4
    4$^{th}$ pass: Decode and set for display 0

Each of the above operations is formulated as a decode command, and these commands make up the reference decode command queue. This approach results in far fewer passes through the VOBU than the brute force approach discussed above.

Once the reference decode command queue has been generated for a VOBU, slow reverse decode control module 420 proceeds to executing each of these commands. This execution may involve multiple passes of the VOBU. The number of passes is a function of the number N of frame buffers 470 and the GOP structure (more references typically imply more passes). Again, rather than moving the data around, the present invention resets the MPEG decoder 460 and sets the data start/end registers to decode the appropriate picture (since the picture positions are extracted when the VOBU is initially parsed).

In addition to processing the reference decode commands, the slow reverse decode control module 420 also processes B picture decode requests, which go into another queue—the B request queue. Unlike references, the B pictures are decoded on demand. The B decode requests are generated by the Slow Reverse Display Control Module 440. For example, right after displaying picture 14, the Slow Reverse Display Control Module 440 realizes that the next-to-display is picture 15, which is a B picture, and therefore adds a B decode request to the queue.

Once all the reference decode commands for the present VOBU have been completed, decoder 460 proceeds to finish the remaining B decodes for that VOBU. At this stage, the decoder 460 does not wait for the video processor 480 to generate a request; decoder 460 continues to decode for as long as there is a free frame buffer available and a B picture that is not yet decoded.

Once all the pictures for the present VOBU have been decoded, the decoder 460 starts processing the next VOBU in the buffer. In this example, the next VOBU is VOBU #n−1. VOBU #n may be freed only after picture I is decoded (open GOP). Picture 1 may be decoded once the last reference from VOBU #n−1 becomes available (which happens once the first reference decode command for VOBU #n−1 is executed).

In a second scenario, the VOBU Buffer might not be large enough to hold two complete VOBUs. This situation would be the case in which the VOBUs are too big for two of them to fit into the buffer. The processing in this case would generally be the same as has been described above, except one difference. Only this difference will be discussed.

Figure 10:
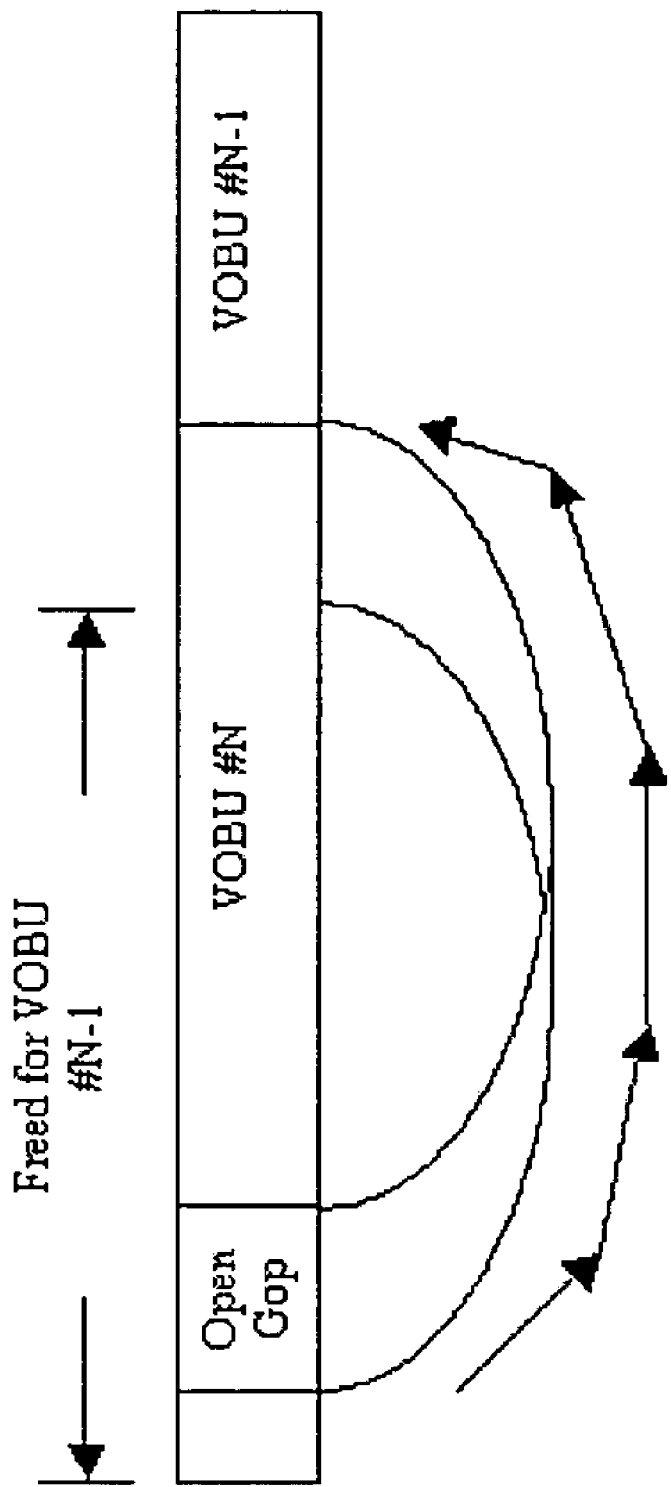
FIG. 10 is a diagram illustrating how the current VOBU is freed before the open GOP B pictures are decoded.
Figure 11:
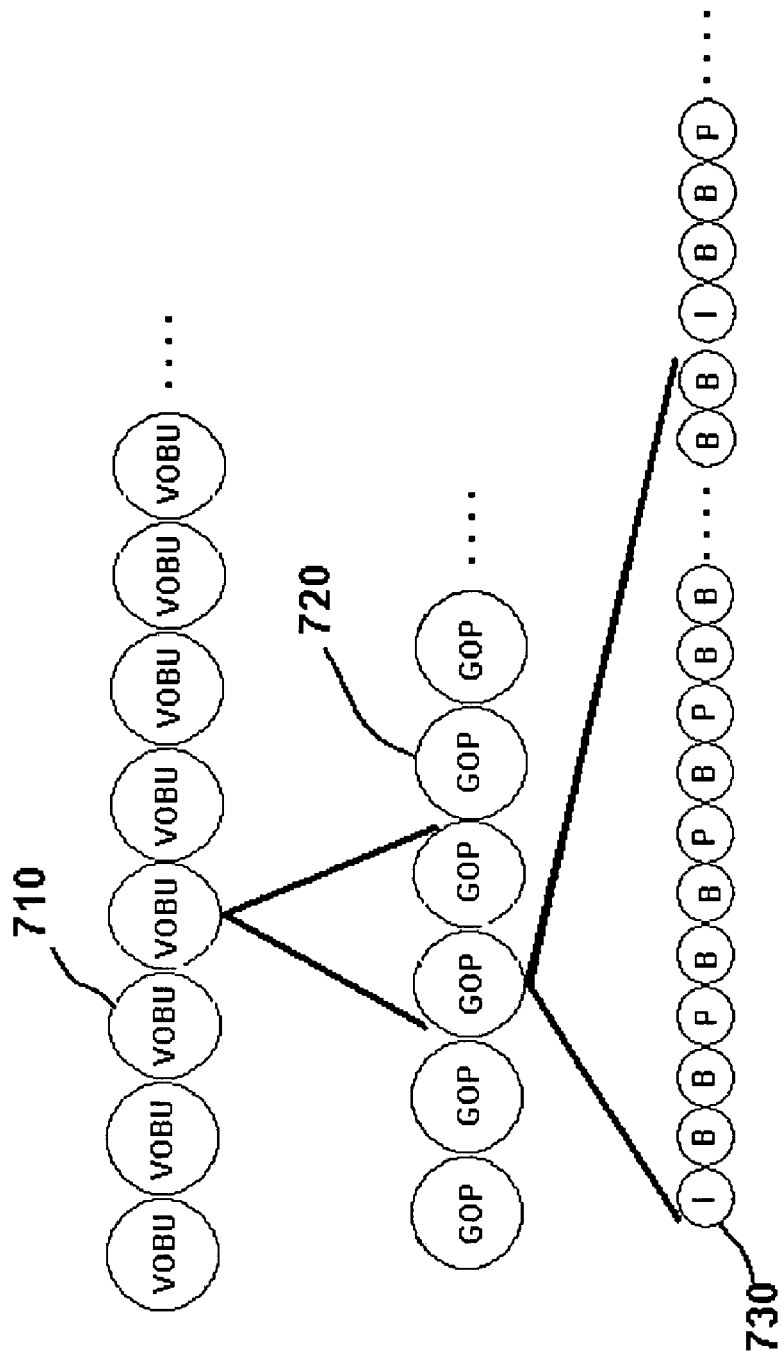
FIG. 11 is a diagram illustrating the relationship between VOBUs, GOPs, and Frames in the Prior Art.

Since the next VOBU cannot fit into the VOBU buffer, the current VOBU will have to be freed before the Open GOP B pictures can be decoded. This lack of buffer space means that Slow Reverse Decode Control Module 420 may have to ensure that these B pictures are available at some alternate address by copying these pictures. Since Slow Reverse Decode Control Module 420 has the positions and sizes of each picture from the initial parsing step, the decode control module 420 will copy the open GOP pictures towards the end of the current VOBU and free the remaining space of the current VOBU (where VOBU size is the size of the copied data). FIG. 10 is a diagram illustrating how the current VOBU is freed before the open GOP B pictures are decoded.

VOBU buffer memory requirements are determined as follows. In order to play the pictures in a VOBU in reverse order, at least one complete VOBU and two Open-GOP B pictures need to be buffered. In the worst-case scenario, VOBU duration is one second (the special case of the last VOBU in a cell, where it could be 1.4 s, is ignored here). At the worst-case bit-rate, this situation yields a minimum ceiling of 1.25 Mbytes. The size of two encoded frames can be a maximum of 80K (2 pictures=2/30 of a second; At 9.8 Mbps, to the size is 80 K bytes of data). Adding some safety margin, 1.4 M bytes is the minimum required size of the VOBU buffer.

Frame buffer memory requirements are determined as follows. Five frame buffers will ensure real-time operation (that is true for 0.5× slow reverse) with most practical GOP structures. For example, assume a GOP structure includes a series of pictures, IBPBPBPBPBPBPBPB (decoding order). This scenario is a hypothetical worst case in the sense that most commercially available DVD content has much shorter and simpler GOPs.

At run time, when the system is ready to start processing this GOP, the five frame buffers will contain the first five pictures of the previous GOP (excluding the Open GOP B pictures). The reference decodes for the current GOP can proceed as and when these frame buffers become available.

FIG. 7 is a diagram of a second scenario, in which pictures from previous GOP are represented as P1, P2, . . . , P17. In this example, pictures from current GOP are represented as C1, C2, . . . , C17. The table in FIG. 8 depicts the state of frame buffers at each display time. Each row is worth a display interval, marked in terms of decode interval. Assuming that the MPEG decoder 460 can decode at a rate of at-least 1.5×, since the playback rate is 0.5×, each display interval can accommodate 3 decode intervals.

From the table in FIG. 8, smooth slow reverse will operate at true 0.5× speed for the given GOP structure. Most practical cases are likely to have 2Bs instead of one, which means that the system can easily operate at rates even faster than 0.5×.

While the preferred embodiment and various alternative embodiments of the invention have been disclosed and described in detail herein, it may be apparent to those skilled in the art that various changes in form and detail may be made therein without departing from the spirit and scope thereof. For example, the MPEG decoder could either be a software module or a hardware module. The slow Reverse Decoder Control and Display Control Modules could potentially run in an interrupt context or in a task context without taking away the core idea of the invention.

I claim:

1. A method for decoding a stream of Video Object Units (VORUs) in a decoder to provide smooth reverse playback of a video data stream, comprising:
    storing at least one Video Object Unit (VOBU) from the stream of VOBUs, the at least one VOBU comprising a plurality of pictures in a buffer including at least one I reference picture, at least one P reference picture, and at least one B reference picture,
    scanning each of the plurality of pictures in the VOBU before decoding any pictures within the VOBU,
    marking positions of each picture in the VOBU,
    decoding all of the plurality of pictures in the VOBU, except any open Group of Pictures (GOP) pictures of the plurality of pictures, requiring reference to an adjacent VOBU,
    copying the open GOP pictures to the buffer, at the end of the at least one VOBU in the buffer while continuing to fetch a next VOBU, and
    decoding open GOP pictures at the end of the at least one VOBU in the buffer using data from the next VOBU in the buffer and open GOP pictures stored the end of the at least one VOBU in the buffer, and
    decoding and rendering all pictures from the stream of VOBU, including the at least one I reference picture, at least one P reference picture, and at least one B reference picture, to produce a reverse playback stream of images for display, the stream of images comprising each picture of the stream of VOBUs in reverse playback order, omitting no pictures from the reverse playback stream of images.

2. A method for smooth reverse playback in a DVD player, comprising:
    selecting slow reverse mode from a DVD navigation program,
    sequentially storing, in a Video Object Unit (VOBU) buffer, pictures from at least one complete Video Object Unit (VOBU) and at-most two complete VOBUs in reverse order,
    scanning each sequentially stored VOBU, and extracting picture parameters for each picture in the VOBU,
    constructing a sequence of reference-frame decode commands to be executed based on the VOBU structure and the available number of frame buffers,
    decoding reference pictures using an MPEG decoder from a sequentially stored VOBU, based upon the extracted picture parameters and the reference-frame decode commands,
    decoding open Group of Pictures (GOP) pictures from a previous VOBU, which require reference to an adjacent VOBU, using the MPEG decoder, releasing the VOBU buffer once all the pictures of a VOBU have been decoded by the MPEG decoder to allow a next VOBU to be sequentially stored in the VOBU buffer, and rendering all of the decoded pictures in reverse order to output a reverse rendered data stream to a video processor for display, wherein sequentially storing, in the VOBU buffer, video data from at least one complete VOBU in reverse order comprises storing two VOBUs in reverse order, VOBU#n and VOBU#n−1 such that after VOBU#n is processed in the VOBU buffer, processing passes to VOBU #n−1, and decoding reference pictures from a sequentially stored VOBU based upon the extracted picture parameters and the reference-frame decode commands comprise:

first parsing VOBU#2 such that the position of every picture header in the VOBU and the picture parameters thereof, including picture type and offset within the VOBU buffer are noted, and resetting the MPEG decoder and setting a start and end of a decoder FIFO to a current offset within the VOBU buffer, so as to read data from the VOBU buffer without having to copy data within the VOBU buffer, and wherein decoding remaining B-pictures from a previous VOBU for an open GOP in an MPEG hardware decoder using the references-frame decode commands comprises:

storing in a first frame buffer, an I reference picture from a previous GOP, storing in a second frame buffer, a P reference picture from the current GOP, and decoding, in a third frame buffer, a B picture from the current VOBU in the VOBU buffer for displaying the B picture.

3. The method of claim 2, wherein decoding reference pictures from a sequentially stored VOBU based upon the extracted picture parameters and the reference-frame decode commands comprises:

performing multiple passes of the VOBU buffer, wherein the number of passes is a function of the number of frame buffers and the GOP structure, wherein in each pass of the VOBU buffer, picture data remains stored in its original location in the VOBU buffer and the MPEG decoder is reset and the start/end registers of a decoder FIFO are reset to decode an appropriate picture for a given pass.

4. The method of claim 3, wherein decoding reference pictures from a sequentially stored VOBU based upon the extracted picture parameters and the reference-frame decode commands comprises:

further decoding B pictures on demand, where B decode requests are generated by a display control module.

5. The method of claim 4, wherein the MPEG hardware decoder, in decoding B-pictures from a previous VOBU for an open GOP does not wait for the display control module to generate a request, but rather decodes remaining B pictures for as long as there is a free frame buffer space available and a B picture that is not yet decoded.

6. The method of claim 4, wherein once all the pictures for the present VOBU have been decoded, the decoder starts processing the next VOBU in the VOBU buffer.

7. The method of claim 2, wherein sequentially storing, in the VOBU buffer, video data from at least one complete VOBU in reverse order, comprises storing less than two complete VOBUs, and freeing the current VOBU is freed from the VOBU buffer before the open GOP B pictures can be decoded, storing the open GOP B pictures at an alternate address, and wherein decoding B-pictures from a previous VOBU for an open GOP in an MPEG decoder comprises decoding the open GOP B pictures from the alternate address.

8. An apparatus for decoding video data in an MPEG decoder, the video data including I-type, P-type and B-type pictures, to provide smooth reverse playback of picture type in the video data in reverse sequence, the apparatus comprising:

a Video Object Unit (VOBU) buffer storing at least one Video Object Unit (VOBU), a decoder, coupled to the VOBU buffer scanning, before decoding, any pictures within the VOBU, marking positions of each picture in the VOBU, and decoding all of the pictures in the VOBU except open Group Of Pictures (GOP) B-type pictures which require a reference picture from an adjacent VOBU to decode, copying the open GOP B-type pictures to the VOBU buffer at the end of the current VOBU in the VOBU buffer while continuing to fetch a next VOBU, and then decoding the open GOP pictures using the next VOBU data in the VOBU buffer and the open GOP pictures copied to the end of the VOBU buffer, wherein the decoder decodes each of the I-type, P-type, and B-type pictures from the video data and outputs all of the I-type, P-type, and B-type pictures in reverse playback order.

9. An apparatus for decoding MPEG video data in reverse order, comprising:

a presentation layer for retrieving temporally compressed video data from a data source and streaming data from the data source, to produce a stream of Video Object Units (VOBUs), each VOBU comprising a plurality of I-type, P-type, and B-type pictures, a buffer storing a VOBU to be decoded, extracting open Group of Pictures (GOP) pictures which require data from an adjacent VOBU in order to be decoded, and storing the open GOP pictures which require data from an adjacent VOBU in order to be decoded at the end of the buffer when the adjacent VOBU is stored in the buffer, and a Motion Picture Experts Group (MPEG) decoder for decoding and rendering pictures from the stream of VOBUs to produce a stream of all of the I-type, P-type, and B-type pictures for display in reverse order; wherein the open GOP pictures which require data from an adjacent VOBU in order to be decoded are decoded using data from stored pictures from the adjacent VOBU.

10. An apparatus for smooth reverse playback of MPEG encoded video data in a DVD player, comprising:

a DVD navigation program having an input for selecting a slow reverse mode, a Video Object Unit (VOBU) buffer sequentially storing, video data from a complete VOBU comprising a plurality of I-type, P-type, and B-type pictures, a decoder scanning each sequentially stored VOBU, extracting picture parameters for each picture in the VOBU, constructing a sequence of reference-frame decode commands to be executed based on the VOBU structure and the available number of frame buffers, decoding reference pictures from a sequentially stored VOBU based upon the extracted picture parameters and the reference-frame decode commands, and a rendering unit rendering the decoded pictures in reverse order to output a reverse rendered data stream to a video processor for display, wherein the decoder decodes closed Group of Pictures (GOP) pictures from the VOBU which do not require reference to an adjacent VOBU, then copies open GOP B-type pictures, which require reference to an adjacent VOBU, to the end of the VOBU buffer, loads the adjacent VOBU for decoding, and then decodes the open GOP B-type pictures, and releases the VOBU buffer once all the pictures of a VOBU have been decoded.

11. The apparatus of claim 10, wherein the VOBU buffer stores two VOBUs in reverse order, VOBU#n and VOBU#n−1 such that after the decoder processes VOBU#n in the VOBU buffer, processing passes to VOBU #n−1, and the decoder, in decoding reference pictures from a sequentially stored VOBU based upon the extracted picture parameters and the reference-frame decode commands, first parses VOBU#2 such that at each picture start code within the VOBU, picture parameters, including picture type and offset within the VOBU buffer are noted.

12. The apparatus of claim 10, wherein the decoder, in decoding remaining B-pictures from a previous VOBU for an open GOP using the references-frame decode commands stores in a first frame buffer, an I-reference picture from a previous GOP, and stores, in a second frame buffer, a P-picture from the current VOBU, and uses a third frame buffer for decoding and displaying the Open-GOP B-picture from the previous VOBU in the VOBU Buffer.

13. The apparatus of claim 10, wherein the decoder, in decoding reference pictures from a sequentially stored VOBU based upon the extracted picture parameters and the reference-frame decode commands performs multiple passes of the VOBU buffer, wherein the number of passes is a function of the number of frame buffers and the GOP structure, wherein in each pass of the VOBU buffer, picture data remains stored in its original location in the VOBU buffer and the decoder is reset and the start/end registers of a decoder FIFO are reset to decode an appropriate picture for a given pass.

14. The apparatus of claim 13, wherein the decoder, in decoding reference pictures from a sequentially stored VOBU based upon the extracted picture parameters and the reference-frame decode commands further decodes B pictures on demand, where B-picture decode requests are generated by the Display Control Module.

15. The apparatus of claim 14, wherein the decoder, in decoding B-pictures from a previous VOBU for an open GOP does not wait for the rendering unit to generate a request, but rather decodes remaining B-pictures for as long as there is a free frame buffer space available and a B-picture that is not yet decoded.

16. The apparatus of claim 15, wherein once all the pictures for the present VOBU have been decoded, the decoder starts processing the next VOBU in the VOBU buffer.

17. The apparatus of claim 10, wherein the VOBU buffer stores less than two complete VOBUs, and the decoder frees the current VOBU from the VOBU buffer before the open GOP B-pictures can be decoded, and the decoder stores the open GOP B-pictures at an alternate address, and decodes B-pictures from a previous VOBU for an open GOP in an MPEG decoder comprises decoding the open GOP B-pictures from the alternate address.

* * * * *